US011275946B1

(12) United States Patent
Raz Goldfarb et al.

(10) Patent No.: US 11,275,946 B1
(45) Date of Patent: Mar. 15, 2022

(54) GENERATION OF COMPUTER VISION LABELS FROM REMOTELY-ASSISTED AUGMENTED REALITY SESSIONS

(71) Applicant: International Business Machines Corporation, Armonk, NY (US)

(72) Inventors: Adi Raz Goldfarb, Akko (IL); Erez Lev Meir Bilgory, Kiryat Tivon (IL)

(73) Assignee: International Business Machines Corporation, Armonk, NY (US)

(*) Notice: Subject to any disclaimer, the term of this patent is extended or adjusted under 35 U.S.C. 154(b) by 21 days.

(21) Appl. No.: 17/020,856

(22) Filed: Sep. 15, 2020

(51) Int. Cl.
| G06T 19/00 | (2011.01) |
| G06K 9/00  | (2022.01) |
| H04L 51/10 | (2022.01) |
| H04L 51/046 | (2022.01) |

(52) U.S. Cl.
CPC ........ *G06K 9/00671* (2013.01); *G06T 19/006* (2013.01); *H04L 51/046* (2013.01); *H04L 51/10* (2013.01)

(58) Field of Classification Search
None
See application file for complete search history.

(56) References Cited

U.S. PATENT DOCUMENTS

| 11,080,938 B1* | 8/2021 | Tzur ..................... G06T 19/006 |
| 2014/0310595 A1 | 10/2014 | Acharya |
| 2019/0370544 A1 | 12/2019 | Wright, Jr. |

OTHER PUBLICATIONS

U.S. Appl. No. 16/681,888, Oded Dubovsky.

* cited by examiner

*Primary Examiner* — Nicholas R Wilson
(74) *Attorney, Agent, or Firm* — Dvir Gassner (57) ABSTRACT

Receiving data recorded during a remotely-assisted augmented reality session held between a remote user and a local user, the data including: drawn graphic annotations that are associated with locations in a 3D model representing a physical scene adjacent the local user, and a transcript of a conversation between the remote and local users. Generating at least one candidate label for each location, each candidate label being textually descriptive of a physical entity that is located, in the physical scene, at a location corresponding to the respective location in the 3D model. The generation of each candidate label includes: for each graphic annotation, automatically analyzing the transcript to detect at least one potential entity name that was mentioned, by the remote and/or local user, temporally adjacent the drawing of the respective graphic annotation. Accepting or rejecting each candidate label, to define it as a true label of the respective physical entity.

20 Claims, 5 Drawing Sheets

GENERATION OF COMPUTER VISION LABELS FROM REMOTELY-ASSISTED AUGMENTED REALITY SESSIONS

BACKGROUND

The invention relates to the field of computer vision.

Computer vision is a vast technological field, in which software and hardware, and sometimes also artificial intelligence (AI), are applied to tasks such as object recognition, three-dimensional (3D) scene reconstruction, event detection, video tracking, augmented reality (AR), 3D pose estimation, motion estimation, visual servoing, scene modeling, and image restoration, to name some prominent examples.

Object recognition, in particular, involves automated tools that can locate and identify objects in images and videos. Commonly, once an object is located and identified, a computer vision "label" is overlaid on the respective image or video, indicating the object's location and name (or other textual description). When such automated tools are AI-based, they typically undergo a training process in which a machine learning model is generated by learning from example images or videos that are manually labeled. The labeling of images and videos for training purposes, however, if often a labor-intensive task.

In certain scenarios, object labeling in images, videos, and even computerized 3D models is performed entirely manually, without the aid of object recognition tools. A human simply views the image, video, or 3D model, and operates suitable software to append labels in the right locations. This is common practice when the number of objects to be labeled in the particular task is relatively small, or when no reliable object recognition algorithm is available for the pertinent object types.

Manual object labeling is also prevalent, albeit usually as a byproduct, in remotely-assisted (or "guided") augmented reality (AR) sessions. This is a relatively new use of AR technology, in which a remotely-located user assists and guides a local user in handling physical equipment in the local user's vicinity, by overlaying digital content on a real time video captured by the local user's video camera. As the local user views this video of his or her physical surroundings on a video display, the video is simultaneously transmitted to the remote user who, using computer software, can add textual and graphical annotations at various locations on the video, which are immediately transmitted back to the local user and overlaid on the video he or she is viewing. These annotations, if they name or describe physical objects depicted in the video (e.g., equipment or machine parts), can be regarded as computer vision "labels" of these objects.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment is directed to a method which comprises operating at least one hardware processor to: Receive data recorded during a remotely-assisted augmented reality session held between a remote user and a local user, the data comprising: (i) graphic annotations drawn by at least one of the remote and local users, wherein each of the graphic annotations is associated with a location in a three-dimensional (3D) model representing a physical scene adjacent the local user, and (ii) a transcript of a conversation between the remote and local users. Automatically generating at least one candidate label for each of the locations, wherein each of the candidate labels is textually descriptive of a physical entity that is located, in the physical scene, at a location corresponding to the respective location in the 3D model, and wherein the generation of each of the candidate labels comprises: for each of the graphic annotations, automatically analyzing the transcript to detect at least one potential entity name that was mentioned, by at least one of the remote and local users, temporally adjacent the drawing of the respective graphic annotation. Aaccept or reject each of the candidate labels, to define the respective candidate label as a true label of the respective physical entity.

Another embodiment is directed to a system which comprises at least one hardware processor, and a non-transitory computer-readable storage medium having program code embodied therewith, the program code executable by said at least one hardware processor to: Receive data recorded during a remotely-assisted augmented reality session held between a remote user and a local user, the data comprising: (i) graphic annotations drawn by at least one of the remote and local users, wherein each of the graphic annotations is associated with a location in a three-dimensional (3D) model representing a physical scene adjacent the local user, and (ii) a transcript of a conversation between the remote and local users. Automatically generating at least one candidate label for each of the locations, wherein each of the candidate labels is textually descriptive of a physical entity that is located, in the physical scene, at a location corresponding to the respective location in the 3D model, and wherein the generation of each of the candidate labels comprises: for each of the graphic annotations, automatically analyzing the transcript to detect at least one potential entity name that was mentioned, by at least one of the remote and local users, temporally adjacent the drawing of the respective graphic annotation. Aaccept or reject each of the candidate labels, to define the respective candidate label as a true label of the respective physical entity.

A further embodiment is directed to a computer program product comprising a non-transitory computer-readable storage medium having program code embodied therewith, the program code executable by at least one hardware processor to: Receive data recorded during a remotely-assisted augmented reality session held between a remote user and a local user, the data comprising: (i) graphic annotations drawn by at least one of the remote and local users, wherein each of the graphic annotations is associated with a location in a three-dimensional (3D) model representing a physical scene adjacent the local user, and (ii) a transcript of a conversation between the remote and local users. Automatically generating at least one candidate label for each of the locations, wherein each of the candidate labels is textually descriptive of a physical entity that is located, in the physical scene, at a location corresponding to the respective location in the 3D model, and wherein the generation of each of the candidate labels comprises: for each of the graphic annotations, automatically analyzing the transcript to detect at least one potential entity name that was mentioned, by at least one of the remote and local users, temporally adjacent the drawing of the respective graphic annotation. Aaccept or reject each of the candidate labels, to define the respective candidate label as a true label of the respective physical entity.

In some embodiments, the method further comprises, or the program code is further executable to: automatically calculate a confidence score for each of the candidate labels, the confidence score indicating a likelihood that the respective candidate label correctly describes the respective physical entity.

In some embodiments, the acceptance or rejection of the candidate labels is based on one of: automatically accepting those of the candidate labels whose confidence score is above a predefined threshold, and rejecting all remaining candidate labels; and automatically accepting a predefined number of candidate labels having the highest confidence scores, and rejecting all remaining candidate labels.

In some embodiments, the acceptance or rejection of each of the candidate labels comprises: during a new remotely-assisted augmented reality session held between a new remote user and a new local user: (a) automatically detect that one of the new remote and local users has drawn a new graphic annotation at a location in the 3D model which is at or adjacent a location of at least one of the candidate labels; (b) automatically present to the new remote user the at least one candidate label of (a); and (c) accept or reject the presented at least one candidate label responsive to a selection made by the new remote user.

In some embodiments, the analysis of the transcript comprises applying a Natural Language Understanding (NLU) algorithm to at least some of the transcript.

In some embodiments, the transcript is of at least one of: a textual conversation between the remote and local users; and a transcribed voice conversation between the remote and local users.

In some embodiments, the method further comprises, or the program code is further executable to: automatically suggest one of the true labels during a new remotely-assisted augmented reality session held between a new remote user and a new local user, by: (a) automatically detecting that one of the new remote and local users has drawn a new graphic annotation at a location in the 3D model which is at or adjacent a location of one of the true labels; (b) automatically presenting to the new remote user said one of the true labels of (a); and (c) automatically applying said one of the true labels of (a) to the new graphic annotation, responsive to a selection made by the new remote user.

In some embodiments, the method further comprises, or the program code is further executable to: automatically suggest one of the true labels during a new remotely-assisted augmented reality session held between a new remote user and a new local user, by: (a) automatically analyzing, in real time, a new conversation between new the remote and local users, to detect a potential entity name that is being mentioned; (b) automatically correlating the potential entity name of (a) with one of the true labels; (c) automatically presenting to the new remote user: said one of the true labels of (b), and a new graphic annotation at a location, in the 3D model, associated with said one of the true labels of (b); and (d) responsive to a selection made by the new remote user, automatically drawing the graphic annotation of (c), and presenting said one of the true labels of (b) in conjunction with the drawn graphic annotation of (c).

In some embodiments, the analysis of the new conversation between new the remote and local users comprises applying a reference resolution algorithm to a real time transcript of the new conversation.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

An automated technique to leverage recorded remotely-assisted AR sessions for the generation of computer vision labels is disclosed herein. The technique may be embodied in a method, a system, and a computer program product.

The technique is particularly useful when annotations made by either a local user or a remote user in a session do not include meaningful textual descriptions of the annotated objects, and thus cannot readily serve as proper computer vision labels.

In such scenarios, advantageously, the technique leverages a transcript of an in-session conversation between the remote and local users to generate the missing textual descriptions, thereby creating computer vision labels that both localize and describe the underlying objects.

The generated labels may then be utilized for a variety of purposes, whether in the realm of computer vision or not. For example, they may be utilized in subsequent remotely-assisted AR sessions involving the same scene, by suggesting them, in real time, as annotations for various objects that are being discussed or only graphically annotated. As another example, these labels may be used to automatically or semi-automatically annotate a "digital twin" of a physical object—a computer-simulated 3D model of the object. As a further example, they may be used to enrich a training set of a machine learning task, together with their associated images and/or videos.

Figure 1:
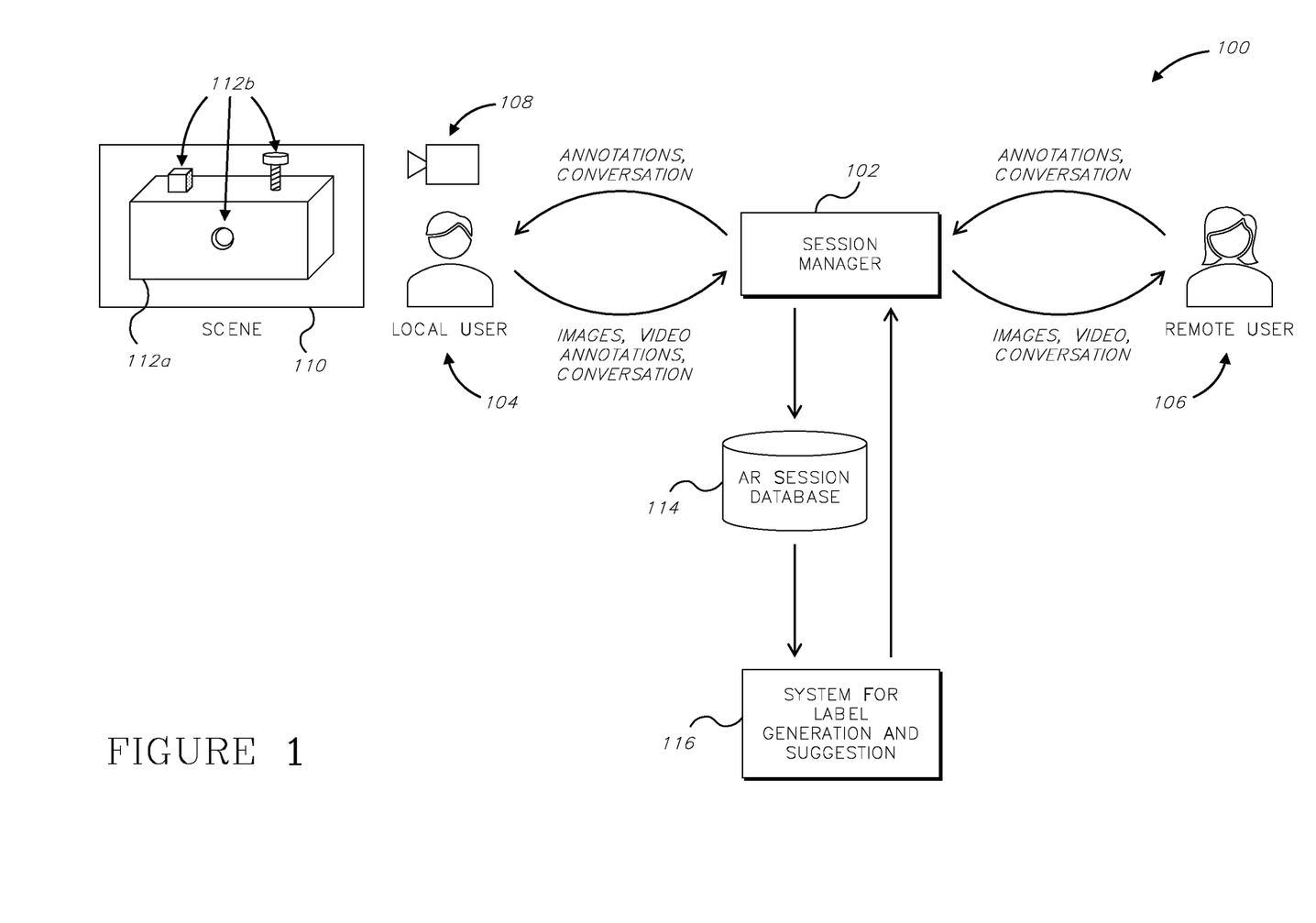
FIG. 1 is flow diagram of a process involving a remotely-assisted AR session, generation of computer vision labels from the session, and use of these labels in subsequent sessions associated with the same scene, in accordance with embodiments.

Reference is now made to FIG. 1, which is a flow diagram of a process 100 involving a remotely-assisted AR session, generation of computer vision labels from the session, and use of these labels in subsequent sessions associated with the same scene.

In process 100, AR session data are received, transmitted, and/or processed by a remotely-assisted session manager 102 during a remotely-assisted AR session. Session manager 102 denotes one or more computing devices that manage the remotely-assisted AR session between a local user 104 and a remote user 106. For example, session manager 102 may be a computing device located in the immediate vicinity of local user 104, and communicates over a network with a personal computing device (not shown) of remote user 106. As another example, session manager 102 may be a computing device located in the immediate vicinity of remote user 106, and communicates over a network with a personal computing device (not shown) of local user 104. As a further example, session manager 102 may be a server-type computing device situated away from users 104 and 106, and accessible to them, via their personal computing devices, over a network. The network may be, for example, a LAN (Local Area Network) or a WAN (Wide Area Network, such as the Internet).

Session manager 102, or the personal computing device of local user 104, may include or be functionally associated with a camera 108 that captures still images and/or videos of a physical scene 110 adjacent the local user.

Scene 110 may include any indoors or outdoors area at which a procedure is performed by local user 104 with respect to an object 112a. By way of example, scene 110 may be an area in a factory in which a certain piece of equipment (e.g., a machine or any type of apparatus) undergoes maintenance by local user 104, or an engine compartment of a motor vehicle in which a certain automotive part is being serviced by the local user.

Object 112a may in fact include a multiplicity of smaller objects 112b, such as distinct parts or designated regions of object 112a. In the illustrated example, these objects 112b are a rectangular button, a screw, and a bore. For accurate notation of all types of objects that may be found in a scene, be it whole apparatuses or parts/regions of an apparatus, they are each referred to hereinafter as a "physical entity."

The images/and or videos captured by camera 108 may be transmitted to remote user 106 for viewing, and may also be displayed to local user 104, for example on a screen of a portable computing device, a wearable display, or the like.

Session manager 102, or the personal computing device of local user 104, may further obtain or calculate, in accordance with conventional techniques, camera position and orientation data where each camera position and orientation datum is defined relative to a set of three-dimensional (3D) coordinates of scene 110.

Session manager 102, or the personal computing device of any one of the users, may further obtain or reconstruct, in accordance with conventional techniques, a 3D model of scene 110, which is defined relative to the aforementioned set of 3D coordinates of the scene.

Session manager 102, or the personal computing device of remote user 106, may further manage generation and transmission of annotations, such as text and/or graphic annotations, which the remote user creates and associates with various locations in the images and/or video he or she views. The locations of these annotations are then translated, by session manager 102 or the personal computing device of remote user 106, into corresponding coordinates in the 3D model of scene 110. The annotations and their coordinates are transmitted to the personal computing device of local user 104, and displayed to him or her as an augmented layer over the real time video (or images) of scene 110.

For example, during the remotely-assisted AR session, remote user 106 may use one or more input devices (e.g., keyboard, pointing device, touch screen, etc.) to overlay annotations on the displayed physical entities of scene 110. For instance, if remote user 106 wishes to instruct local user 104 to remove the depicted screw from object 112a, then the remote user may draw a graphic annotation at the location of the screw in one of the images, the video, or the 3D model, such as an arrow pointing at the location, a shape surrounding the location, or any other type of visual marking of the location. Although the location is typically a point, it could also be a circumscribed two-dimensional (2D) area or even a circumscribed 3D space.

Remote user 106 may accompany that graphic annotation with text describing the annotated physical entity, in which case this combined textual-graphic annotation can be readily stored as a computer vision label of the physical entity. However, in many cases, remote user 106 merely draws a graphic annotation at the location of the physical entity, and provides a description (e.g., a name) of that physical entity only in the textual or voice chat he or she simultaneously conducts with local user 104.

Figure 4:
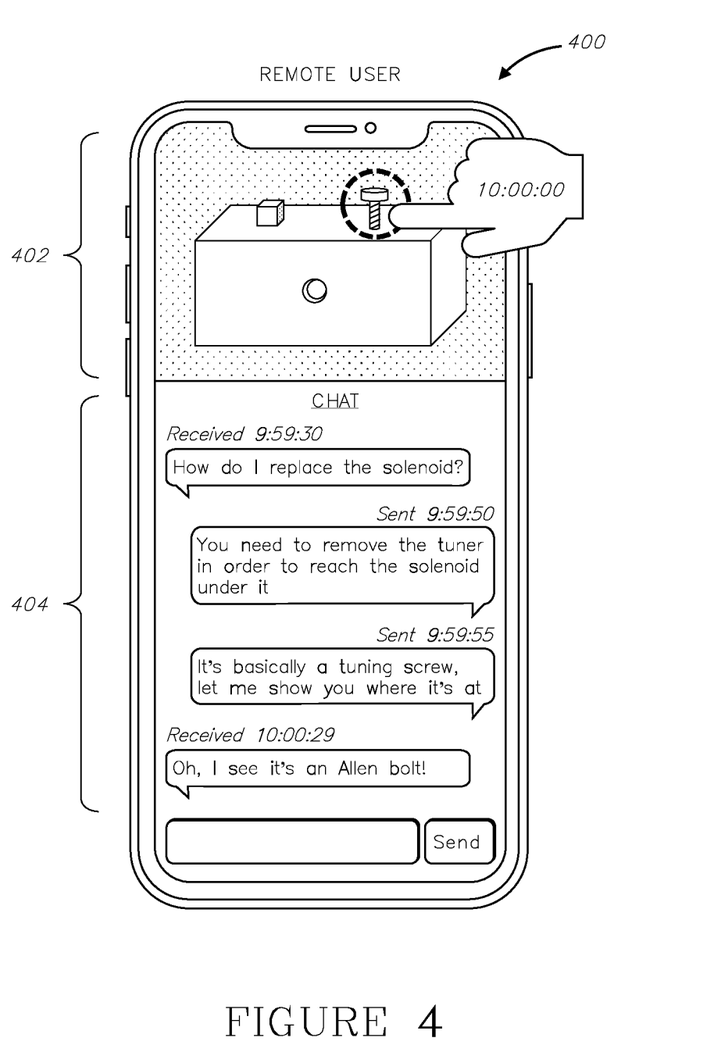
FIG. 4 is a semi-pictorial illustration of an exemplary personal computing device during a remotely-assisted AR session, in accordance with embodiments.

Interim reference is made to FIG. 4, which is a semi-pictorial illustration of an exemplary personal computing device 400 (in this example, a smart phone) of the remote user, during a remotely-assisted AR session. Specialized software running on device 400 may facilitate the session, by interfacing with one or more cameras of the device, with its network (e.g., Internet) connection functionalities (e.g., to conduct text, voice, and/or video chats), and by providing a graphical user interface (GUI) with functionalities required for the session.

One region on the display of device 400 displays an image or video 402 received from the camera of the local user, and another region displays a textual chat 404 between the remote user and the local user. The displayed textual chat 404 includes messages over a time span between 9:59:30 and 10:00:29 (hours:minutes:seconds). The local user asks how to replace a solenoid, to which the remote user responds with instructions to remove a "tuner," which he or she later calls a "tuning screw." At 10:00:00, the remote user touches a location on the display where the subject screw is shown, and/or otherwise interacts with a user interface of device 400 in order to draw a circle around the screw. A short while later, the local user comments, probably after having inspected the screw from up close, that "it's an Allen bolt!"

This exemplifies that, although the name or description of that physical entity (the screw) cannot be deduced from the graphic annotation drawn around it alone, analysis of the conversation transcript that is temporally adjacent the act of drawing of the graphic annotation—can. In this example, the description (name) of the physical entity is either "solenoid," "tuner," "tuning screw," or "Allen bolt."

Reference is now made back to FIG. 1. Although it is typical, in remotely-assisted AR sessions, that annotations are made by remote user 106, they may just as well be made by local user 104. For example, local user 104 may draw an arrow pointing at a physical entity, and pose a question to remote user 106, via text, voice, or video chat, as to the nature of that physical entity or how it should be manipulated.

Session manager 102 may further facilitate transmission of a conversation between local user 104 and remote user 106, such as in the form of a textual chat (as illustrated in FIG. 4), a voice chat, and/or a face-to-face video chat between them, all during the remotely-assisted AR session.

Session manager 102 may record, in an AR session database, 114 all or some of the data obtained, used, transmitted, generated, and/or calculated during or with respect to multiple remotely-assisted AR sessions, such as images, videos, camera position and orientation data, 3D model, annotations, and conversations. If the remotely-assisted AR session included a voice chat or a video chat between its participants, then a transcript of such conversation may be generated by a speech-to-text engine, and stored in AR session database 114 in lieu of or in addition to the actual voice or video file. For simplicity of discussion, the following descriptions refer just to a transcript of the conversation, which is either the text of a conversation which was conducted originally in text, or the transcription of a voice or video conversation, as the case may be.

The stored data, or some thereof, may be time-stamped, to later enable temporal correlation between different modalities of the data. For example, the transcript may be stored in conjunction with metadata in the form of a time stamp per each message, utterance, sentence, or the like, denoting when that message/utterance/sentence was transmitted during the conversation. Similarly, a time stamp may be stored as metadata with each of the annotations, denoting when that annotation was made.

To leverage the recorded remotely-assisted AR sessions for the generation of computer vision labels, a system for label generation (and optionally also suggestion) 116 is provided. System 116 may receive data from AR session database 114, generate labels, and optionally also transmit these labels to session manager 102 so they can be suggested during one or more subsequent remotely-assisted AR sessions involving the same scene 110. The term "the same scene" is not to be strictly construed as involving the same geographic location; rather, the same scene may in fact be a scene in a different location to which the same object(s) has been moved, or, more commonly, a scene in which object(s) of the same type exist. For example, a scene may be the engine compartment of a certain car model (and not necessarily the same instance of a car), an apparatus of a certain type (and not necessarily the same instance of the apparatus), or a group of apparatuses of a certain type and in a certain co-arrangement (and not necessarily the same instance of a co-arranged group). Each such scene is typically associated with its own 3D model, which is usable for remotely-assisted AR sessions involving various different instances of the same scene.

Figure 2:
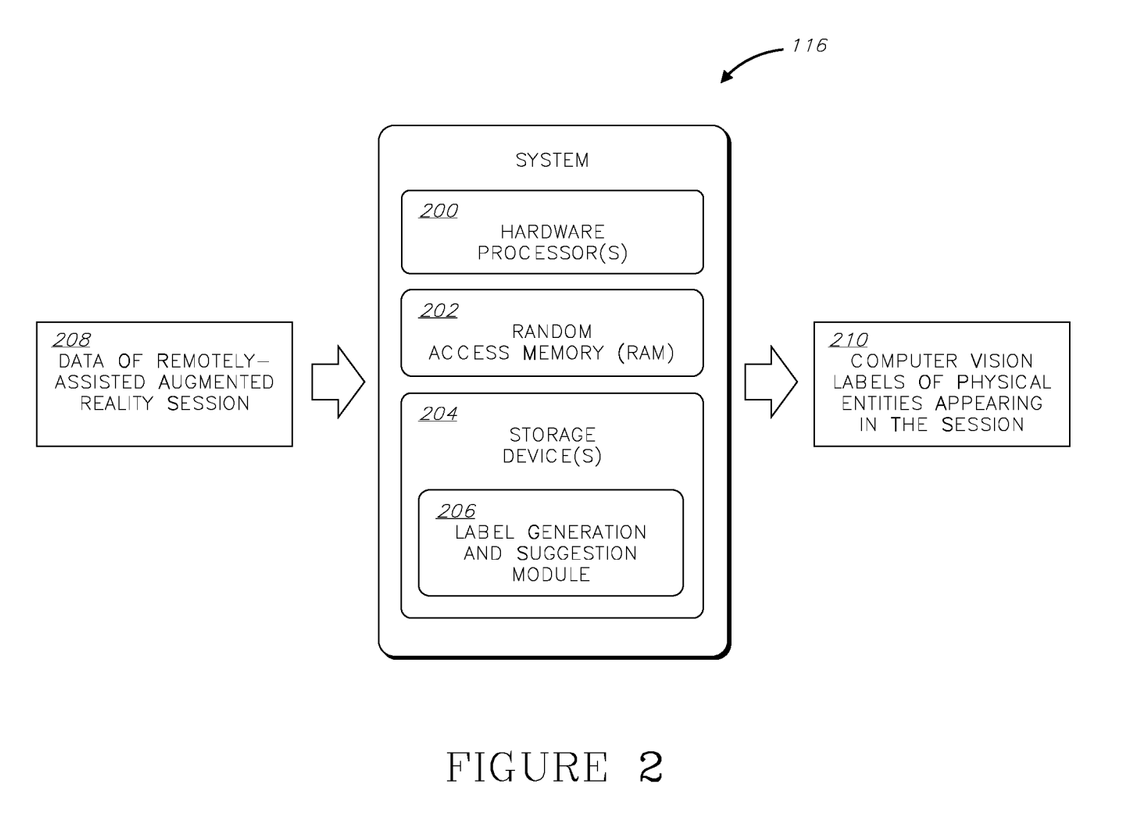
FIG. 2 is a block diagram of a system for computer vision label generation and suggestion, in accordance with embodiments.

Reference is now made to FIG. 2, which shows a detailed block diagram of system 116, according to an embodiment. System 116 may include one or more hardware processor(s) (e.g., CPUs) 200, a random-access memory (RAM) 202, and one or more non-transitory computer-readable storage device(s) 204.

Storage device(s) 204 may have stored thereon program instructions and/or components configured to operate hardware processor(s) 200. The program instructions may include one or more software modules, such as a label generation and suggestion module 206. The software components may include an operating system having various software components and/or drivers for controlling and managing general system tasks (e.g., memory management, storage device control, power management, networking, etc.), and facilitating communication between various hardware and software components.

System 116 may operate by loading instructions of label generation and suggestion module 206 into RAM 202 as they are being executed by processor(s) 200. The instructions of label generation and suggestion module 206 may cause system 116 to receive data of a remotely-assisted AR session, process it, and output computer vision labels 210 of physical entities appearing in the session. Optionally, the instructions of label generation and suggestion module 206 may also cause system 116 to suggest computer vision labels in one or more subsequent remotely-assisted AR sessions involving the same scene. Further optionally, two systems of the kind of system 116 may exist, one including a software module just for label generation, and the other including a software module just for label suggestion.

System 116 as described herein is only an exemplary embodiment of the present invention, and in practice may be implemented in hardware only, software only, or a combination of both hardware and software. System 116 may have more or fewer components and modules than shown, may combine two or more of the components, or may have a different configuration or arrangement of the components. System 116 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 116 may be co-located or distributed, or the system could run as one or more cloud computing "instances," "containers," and/or "virtual machines," as known in the art.

The instructions of label generation and suggestion module 206 are now discussed with reference to the flowchart of FIG. 3, which illustrates a method 300 for computer vision label generation and suggestion, in accordance with present embodiments. As with system 116, method 300 may also be divided into two separate methods, each configure to run on a separate computing device: one method may perform label generation, and the other label suggestion.

Steps of method 300 may either be performed in the order they are presented or in a different order (or even in parallel), as long as the order allows for a necessary input to a certain step to be obtained from an output of an earlier step. In addition, the steps of method 300 are performed automatically (e.g., by system 116 of FIGS. 1 and 2), unless specifically stated otherwise.

In step 302, data recorded during a remotely-assisted AR session is received. The session was held between at least one a remote user and at least one local user. Merely to simplify the following discussions, a single remote user and a single local user are referred to hereinafter.

The received data may include graphic annotations 302a what were each drawn by the remote user or by the local user, and are each associated with a location in a 3D model that represents a physical scene adjacent the local user. The graphic annotations, as discussed above, may include any type of visual marking which indicates a location.

Further included in the received data is a transcript 302b of a conversation which took place between the remote and local users during the remotely-assisted AR session.

In step 304, at least one candidate computer vision label (hereinafter "candidate label") is generated for each of the locations with which the graphic annotations are associated. The candidate label(s) is textually descriptive of a physical entity that is located, in the scene, at a location which corresponds to the respective location in the 3D model. This step may include a number of sub-steps.

In sub-step 306, the transcript may be analyzed, to detect, for each of the graphic annotations, one or more potential entity names that were mentioned in the transcript. The analysis may be time-based, namely—entity names mentioned around the time a certain graphic annotation was drawn are given greater weight than those mentioned much earlier or later than that. For example, entity names may be assigned a time-dependent weight according to a Gaussian function of their temporal distance from the time of the drawing of the graphic annotation (a time on which the Gaussian function may be centered), or according to any other linear or non-linear function.

It is also possible to only analyze a specific segment of the transcript that spans a predefined number of seconds before and/or after the drawing of a certain graphic annotation, and not the entire transcript (which may span minutes, tens of minutes, or even more than an hour). Returning to the example in FIG. 4, if the graphic annotation was drawn, as indicated by its associated time stamp, at 10:00:00, only a period of a few seconds up to a few minutes (e.g., in the range of 10 seconds to 5 minutes) surrounding that time may be analyzed, such as the shown messages that are time-stamped between 9:59:30 and 10:00:30.

In either case, the rationale of the analysis is to detect potential entity names that were mentioned, by either user, temporally adjacent the drawing of the respective graphic annotation.

In sub-step 308, the analysis optionally includes applying one or more Natural Language Understanding (NLU) algorithms to the transcript (or to the smaller time segment of the transcript), in order to identify, for each graphic annotation, words or multi-word terms which can linguistically serve as entity names. For example, nouns, sometimes in conjunction with adjectives, usually have a better potential to be names or descriptions of physical entities than verbs, adverbs, pronouns, and other parts of speech. The NLU algorithm(s) may assign each such word or multi-word term with a score denoting the likelihood that it is indeed an entity name. Back to the example of FIG. 4, each of "solenoid," "tuner," "tuning screw," and "Allen bolt" may be assigned a relatively high score because it is a noun (or two). All the rest of the words in the textual chat of FIG. 4 may be assigned relatively low scores because their part-of-speech has a low potential of making them entity names.

In an additional option, the NLU algorithm(s) may be fed with a domain-specific dictionary, so as to identify potential entity names that are customary in the relevant domain (technical field, business organization, etc.). For example, if the domain in which the remotely-assisted AR session is conducted is maintenance of printers of a certain manufacturer, the respective domain-specific dictionary may include entity names of parts existing in such printers (e.g., "main paper roller," "belt motor," "cyan cartridge holder," "screw," "part no. ABC123," etc.). Potential entity names from the domain-specific dictionary which are identified in the transcript are optionally given higher scores than other potential entity names identified.

In sub-step 310, the analysis also optionally includes applying one or more reference resolution algorithms to the transcript (or to the smaller time segment of the transcript), for each graphic annotation, to consolidate potential entity names that are written or inflected differently into a single entity name. For example, the potential entity names "tuner," "Allen bolt," and "tuning screw" may be consolidated into just "tuning screw," based on the reference resolution algorithm's determination that: all three refer to a screw, synonymous with a bolt; the stem "tune" appears more frequently—in two out of three potential entity names; and, of the two, "tuning screw" includes more words and is therefore more likely to be informative.

An alternative use of the reference resolution algorithm(s) is to assign scores to the different potential entity names without consolidating them. These scores may be assigned respective of the relative tendency of the algorithm(s) to select each potential entity name as the one to survive the consolidation, namely—to represent the entity names that were determined to refer to the same entity. Continuing upon the previous example, "tuning screw" may thus be assigned a high score, "tuner" may be assigned a medium score, and "Allen bolt" a low score, for the reasons explained above.

The potential entity name(s) per graphic annotation that survive the analysis so far, namely—those within the smaller time segment of the transcript (if only that segment was analyzed), and/or an entity name resulting from consolidation of multiple entity names—may be defined as candidate labels of that graphic annotation. Of course, more potential entity names may survive the analysis if its criteria are relaxed, for example if not just a smaller time segment is analyzed, or if potential entity names are not consolidated.

In sub-step 312, the analysis optionally includes calculating a confidence score for each of the candidate labels, indicative of a likelihood that the respective candidate label correctly describes the respective physical entity. The confidence score may be calculated, for example, based on one or more of: the time-dependent weight, the score assigned by the NLU algorithm(s), and the score assigned by the reference resolution algorithm(s).

Continuing upon the example of FIG. 4, a fusion of all three factor will likely assign the highest confidence score to "tuning screw," because it is the closest, temporally, to the drawing of the graphic annotation (having the highest time-dependent weight); and because it provides the best representation of all other entity names that refer to its entity type (having the highest reference resolution score). "tuning screw" may be scored similarly to "Allen bolt" by the NLU algorithm(s), but this does not degrade from the overall superior confidence score of "tuning screw."

Conversely, the confidence score calculated for "solenoid" may be the lowest of all candidate labels, because it had the lowest frequency of appearance, and was mentioned more temporally distant from the drawing of the graphic annotation (30 seconds apart).

Notably, in case two or more factors out of the three are used, they may be combined by simple averaging, by weighted averaging, or according to any other user preference.

As the analysis of step 304 (and one or more of its sub-steps 306-312) concludes, there are provided multiple candidate labels, one or more per graphic annotation. These candidate labels may be stored in a computerized database, such as AR session database 114 of FIG. 1, or a different database included with or accessible by system 116 of FIGS. 1 and 2.

Next, in step 314, the candidate labels may undergo an acceptance/rejection process, in which any accepted candidate label is defined as a true label of the respective physical entity. These true labels may be stored in a computerized database, such as AR session database 114 of FIG. 1, or a different database included with or accessible by system 116 of FIGS. 1 and 2.

In one option 316, the acceptance/rejection process is automatic, and is based on accepting only the candidate label having the highest confidence score per graphic annotation, or, more generally, the top-k candidate labels according to their confidence scores. It is also possible to automatically accept, per graphic annotation, all candidate labels having a confidence score above a certain predefined threshold.

In another option 318, the acceptance/rejection process is manual, and includes presenting the candidate labels to a human reviewer, who can compare them to an image, video, and/or 3D model showing the pertinent graphic annotation, and decide whether to accept or reject them.

In a further option 320, the acceptance/rejection process is facilitated by tapping onto a subsequent, new remotely-assisted AR session involving the same scene, presenting the candidate labels to the remote user of that session, and accepting or rejecting the candidate labels responsive to selections made by the remote user. This way, no dedicated acceptance/rejection process is required, and the process is conveniently and unobtrusively integrated in the new remotely-assisted AR session.

Figure 5:
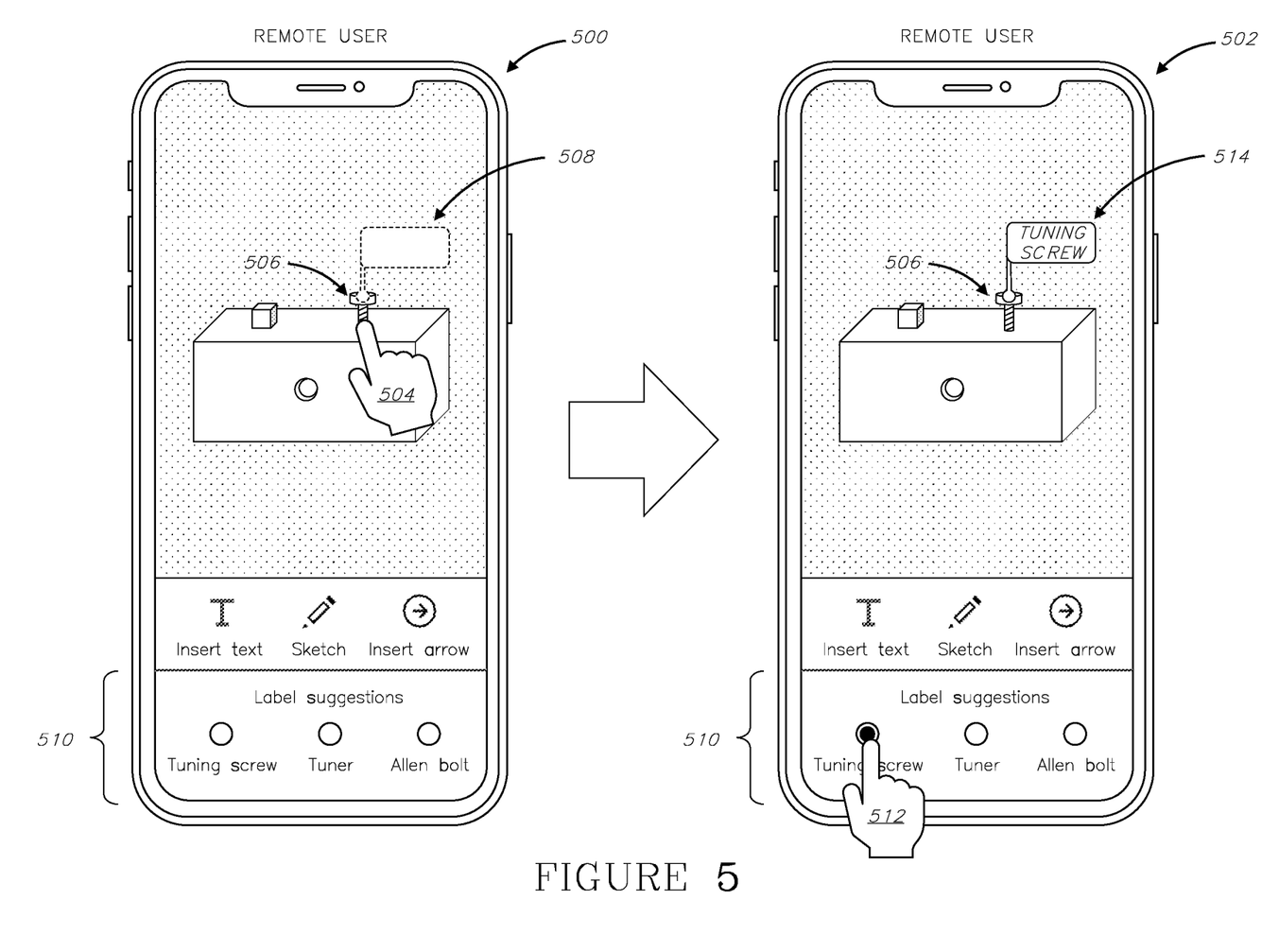
FIG. 5 is a semi-pictorial illustration of an exemplary personal computing device during a remotely-assisted AR session, shown at two stages of its operation, in accordance with embodiments.

FIG. 5, to which reference is now made, exemplifies this latter option 320. The figure is a semi-pictorial illustration of an exemplary personal computing device (in this example, a smart phone) of a remote user, shown at a first stage 500 and at a second stage 502. This device may include functionalities similar to those discussed with reference to device 400 of FIG. 4.

During the normal course of the new remotely-assisted AR session, the remote user may touch (as illustrated by a hand icon 504) or otherwise select a location on the GUI in which a physical entity (e.g., a screw) 506 is displayed. For example, the remote user may select this location in connection with concurrently instructing the local user, via chat, how to manipulate that physical entity 506. Responsive to this selection, a graphic annotation may be drawn by the specialized software running on the personal computing device, at the selected location. Merely as an example, this could be an empty flag icon 508 originating from the selected location, as shown. The GUI of the device may also present to the remote user other options for annotating the displayed scene, such as, just as an example, to insert text, to sketch, or to insert and arrow.

The specialized software may then detect whether the graphic annotation drawn by the remote user (or, in the alternative, by the local user) is adjacent the location associated with any of the candidate labels defined earlier. To this end, the specialized software may compare the coordinates of the drawn graphic annotation with the coordinates of all the candidate labels associated with that same scene, or may interface with another computing device (e.g., session manager 106 of FIG. 1 or system 116 of FIGS. 1 and 2) that performs the comparison and communicates back its results. Then, the specialized software may present to the remote user, in a "label suggestions" pane 510 of the GUI, the candidate label(s) whose coordinates are the closest to those of the drawn graphic annotation. In this example these are only the "tuner," "tuning screw," and "Allen bolt" candidate labels, assuming that the "solenoid" candidate label either did not survive the analysis of step 306 (of FIG. 3) or that the specialized software included a rule to only display the top-k (here, the top-3) candidate labels.

Referring now to the second stage 502, the remote user is then enabled, by the specialized software, to select one of the candidate labels he or she deems to be the true label of the physical entity. For example, the remote user may touch 512 or otherwise select the "tuning screw" candidate label. Responsive to this selection, "tuning screw" is accepted as the true label of physical entity 506, and is optionally automatically overlaid 514 on the image, video, or 3D model displayed in the GUI—both at the device of the remote user and at the device of the local user (to which it is transmitted over a network, for example via session manager 102 of FIG. 1).

Figure 3:
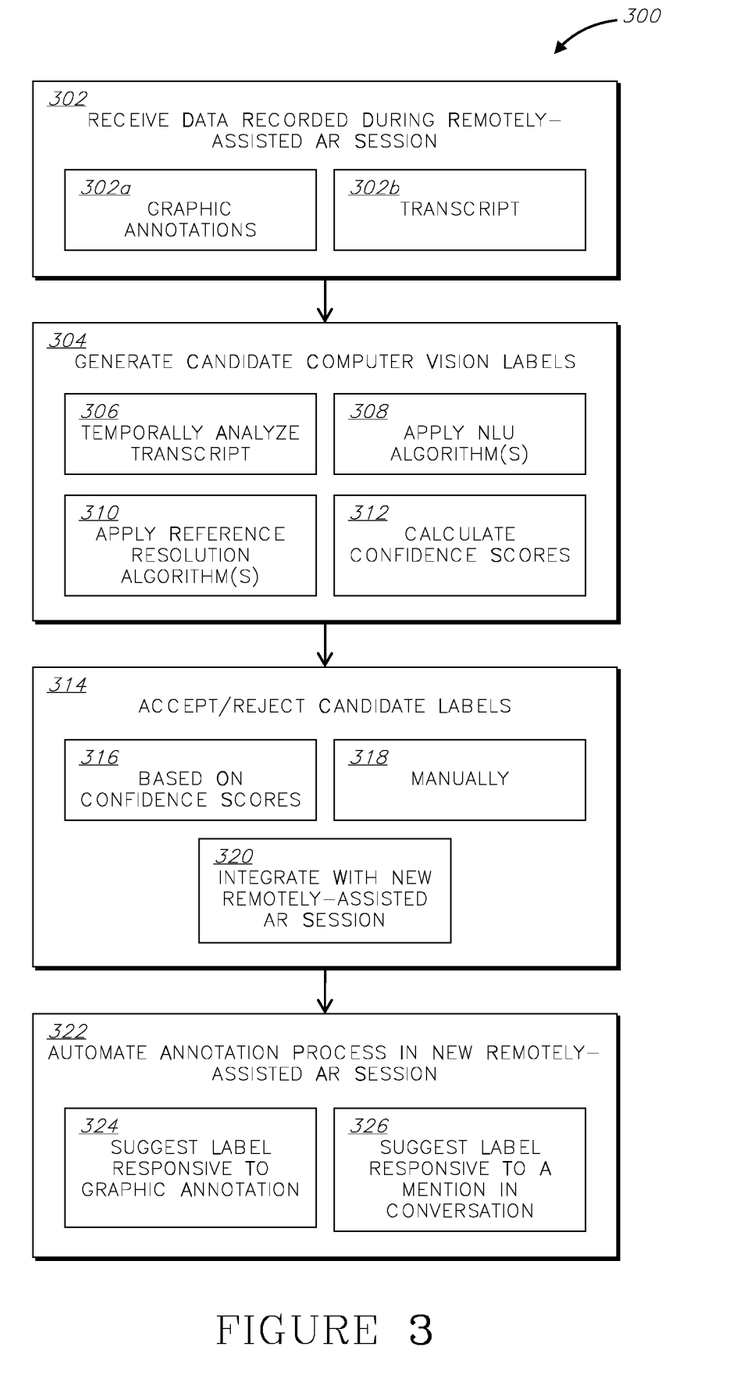
FIG. 3 is a flowchart of a method for computer vision label generation and suggestion, in accordance with embodiments.

Reference is now made back to FIG. 3. In step 322, the true labels may be utilized for automating the annotation process in subsequent, new remotely-assisted AR sessions involving the same scene. This may include automatically suggesting a true label immediately upon detecting a possible need for it during the session.

In one option 324, the suggestion may be made upon detecting that one of the participants in the new session (the remote or the local user) has drawn a graphic annotation at a location which is at or adjacent a location of one of the true labels. This may include comparing the coordinates of the drawn graphic annotation with the coordinates of all the true labels associated with that same scene. Then, the true label which is associated with coordinates closest to those of the graphic annotation may be automatically presented to the remote user for approval, on his or her personal computing device, and the remote user can make a selection to confirm that this true label is indeed the one intended when drawing the graphic annotation. Responsive to the selection by the remote user, the true label may be applied to the drawn graphic annotation, namely—the textual description included in the true label is appended as a textual description of the drawn graphic annotation, and this is transmitted also to the local user for display.

As an alternative to presenting the true label to the remote user and applying it based on his or her selection, the true label may be presented to and selected by the local user. More generally, the true label may be presented to and selected by the user who drew the graphic annotation, or to both users simultaneously.

In another option 326, the suggestion may be made upon detecting that a certain true label has been explicitly or implicitly mentioned in a text, voice, or video chat between participants of the session. The conversation between the remote and local users may be analyzed in real time as it is being conducted. If the conversation takes place in voice or video, it may be transcribed in real time to facilitate its analysis. In the analysis, one or more potential entity names may be detected, similar to what has been described above with reference to sub-step 308. Then, the detected entity name(s) may be compared against the true labels associated with the same scene, to check if the entity name(s) correlate with any of the true labels. This comparison may utilize one or more reference resolution algorithm(s), to check if the detected entity name(s) can be resolved to any of the true labels. Optionally, based on the comparison, each of the true labels is assigned a 'conversation score' that denotes the likelihood of it being the one mentioned in the conversation.

Optionally, camera position and orientation data are also analyzed in real time during the session, to calculate which physical entities (for which true labels exist) are visible at any moment in the images and/or video of the scene captured by the local user's camera. This allows for the aforementioned correlation of detected entity names with true labels to be also based on the visibility of the pertinent physical entities during the time they are being mentioned in the conversation; and, if multiple physical entities are visible—to take into account the centrality of their location within a field of view of the camera. Generally, a true label of a physical entity that is both visible in the images and/or video and is mentioned in the conversation, is more likely to be the one really being intended by the remote and/or local user than a true label that is perhaps mentioned but is not visible. The same rationale applies to a true label of a physical entity that is visible more centrally in the field of view than another physical entity.

Optionally, each true label that correlates with an entity name detected in the conversation may be assigned a 'visibility score' respective of its visibility and centrality in the concurrent images and/or video. For example, a true label of a physical entity not visible at the moment (or during a time window of at least a few seconds or a few dozen seconds adjacent its mentioning) may be given a score of 0 (zero), a true label of a physical entity that is visible and is located exactly in the center of the field of view may have a score of 1 (one), and a true label of a physical entity that is visible but is not centrally located may be assigned a score of between 0 and 1, respective of its distance from the center.

For example, with reference to FIG. 4, if the conversation mentions a "screw," and the concurrent camera position and orientation data points at the fact that only the screw located on the top facet of the rectangular box is visible at the moment, then the true label "tuning screw" may be assigned with a visibility score of 0.7 (given its distance from the center), and various true labels of screws located on the three non-visible facets of the box (and hence not shown in this Figure) may be assigned with a visibility score of 0.

Then, the true label having the highest conversation score, the highest visibility score, or a highest fusion of the conversation and visibility scores, may be presented to the remote user for approval, along with an automatically-drawn graphic annotation in a location associated with that true label. The remote user can then select to confirm that the true label, at that location, is indeed the one intended in the conversation. It is also possible to present to the remote user the top-k scoring true labels (e.g., the top 2-5 true labels), from which he or she can select. Responsive to the selection, the true label and its graphic annotation are automatically presented and drawn over the image or video shown at the personal computing devices of both the remote and local users.

As an alternative to presenting the true label to the remote user and confirming it based on his or her selection, the true label may be presented to and selected by the local user. More generally, the true label may be presented to and selected by the user who mentioned it in the chat, or to both users simultaneously.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising operating at least one hardware processor to:
   receive data recorded during a remotely-assisted augmented reality session held between a remote user and a local user, the data comprising:
      graphic annotations drawn by at least one of the remote and local users, wherein each of the graphic annotations is associated with a location in a three-dimensional (3D) model representing a physical scene adjacent the local user, and
      a transcript of a conversation between the remote and local users;
   automatically generate at least one candidate label for each of the locations, wherein each of the candidate labels is textually descriptive of a physical entity that is located, in the physical scene, at a location corresponding to the respective location in the 3D model, and wherein the generation of each of the candidate labels comprises:
      for each of the graphic annotations, automatically analyzing the transcript to detect at least one potential entity name that was mentioned, by at least one of the remote and local users, temporally adjacent the drawing of the respective graphic annotation; and
   accept or reject each of the candidate labels, to define the respective candidate label as a true label of the respective physical entity.

2. The method of claim 1, further comprising operating the at least one hardware processor to:
   automatically calculate a confidence score for each of the candidate labels, the confidence score indicating a likelihood that the respective candidate label correctly describes the respective physical entity.

3. The method of claim 2, wherein the acceptance or rejection of the candidate labels is based on one of:
   automatically accepting those of the candidate labels whose confidence score is above a predefined threshold, and rejecting all remaining candidate labels; and
   automatically accepting a predefined number of candidate labels having the highest confidence scores, and rejecting all remaining candidate labels.

4. The method of claim 1, wherein the acceptance or rejection of each of the candidate labels comprises:
   during a new remotely-assisted augmented reality session held between a new remote user and a new local user:
      (a) automatically detect that one of the new remote and local users has drawn a new graphic annotation at a location in the 3D model which is at or adjacent a location of at least one of the candidate labels;
      (b) automatically present to the new remote user the at least one candidate label of (a); and
      (c) accept or reject the presented at least one candidate label responsive to a selection made by the new remote user.

5. The method of claim 1, wherein the analysis of the transcript comprises applying a Natural Language Understanding (NLU) algorithm to at least some of the transcript.

6. The method of claim 1, wherein the transcript is of at least one of:
   a textual conversation between the remote and local users; and
   a transcribed voice conversation between the remote and local users.

7. The method of claim 1, further comprising automatically suggesting one of the true labels during a new remotely-assisted augmented reality session held between a new remote user and a new local user, by:
   (a) automatically detecting that one of the new remote and local users has drawn a new graphic annotation at a location in the 3D model which is at or adjacent a location of one of the true labels;
   (b) automatically presenting to the new remote user said one of the true labels of (a); and
   (c) automatically applying said one of the true labels of (a) to the new graphic annotation, responsive to a selection made by the new remote user.

8. The method of claim 1, further comprising automatically suggesting one of the true labels during a new remotely-assisted augmented reality session held between a new remote user and a new local user, by:
   (a) automatically analyzing, in real time, a new conversation between new the remote and local users, to detect a potential entity name that is being mentioned;
   (b) automatically correlating the potential entity name of (a) with one of the true labels;
   (c) automatically presenting to the new remote user:
      said one of the true labels of (b), and a new graphic annotation at a location, in the 3D model, associated with said one of the true labels of (b); and (d) responsive to a selection made by the new remote user, automatically drawing the graphic annotation of (c), and presenting said one of the true labels of (b) in conjunction with the drawn graphic annotation of (c).

9. The method of claim 8, wherein the analysis of the new conversation between new the remote and local users comprises applying a reference resolution algorithm to a real time transcript of the new conversation.

10. A system comprising:

(i) at least one hardware processor; and (ii) a non-transitory computer-readable storage medium having program code embodied therewith, the program code executable by said at least one hardware processor to:

receive data recorded during a remotely-assisted augmented reality session held between a remote user and a local user, the data comprising:

graphic annotations drawn by at least one of the remote and local users, wherein each of the graphic annotations is associated with a location in a three-dimensional (3D) model representing a physical scene adjacent the local user, and a transcript of a conversation between the remote and local users;

automatically generate at least one candidate label for each of the locations, wherein each of the candidate labels is textually descriptive of a physical entity that is located, in the physical scene, at a location corresponding to the respective location in the 3D model, and wherein the generation of each of the candidate labels comprises:

for each of the graphic annotations, automatically analyzing the transcript to detect at least one potential entity name that was mentioned, by at least one of the remote and local users, temporally adjacent the drawing of the respective graphic annotation; and accept or reject each of the candidate labels, to define the respective candidate label as a true label of the respective physical entity.

11. The system of claim 10, wherein the program code is further executable to:

automatically calculate a confidence score for each of the candidate labels, the confidence score indicating a likelihood that the respective candidate label correctly describes the respective physical entity.

12. The system of claim 11, wherein the acceptance or rejection of the candidate labels is based on one of:

automatically accepting those of the candidate labels whose confidence score is above a predefined threshold, and rejecting all remaining candidate labels; and automatically accepting a predefined number of candidate labels having the highest confidence scores, and rejecting all remaining candidate labels.

13. The system of claim 10, wherein the acceptance or rejection of each of the candidate labels comprises:

during a new remotely-assisted augmented reality session held between a new remote user and a new local user:

(a) automatically detect that one of the new remote and local users has drawn a new graphic annotation at a location in the 3D model which is at or adjacent a location of at least one of the candidate labels;

(b) automatically present to the new remote user the at least one candidate label of (a); and (c) accept or reject the presented at least one candidate label responsive to a selection made by the new remote user.

14. The system of claim 10, wherein the analysis of the transcript comprises applying a Natural Language Understanding (NLU) algorithm to at least some of the transcript.

15. The system of claim 10, wherein the transcript is of at least one of:

a textual conversation between the remote and local users; and a transcribed voice conversation between the remote and local users.

16. The system of claim 10, wherein the program code is further executable to automatically suggest one of the true labels during a new remotely-assisted augmented reality session held between a new remote user and a new local user, by:

(a) automatically detecting that one of the new remote and local users has drawn a new graphic annotation at a location in the 3D model which is at or adjacent a location of one of the true labels;

(b) automatically presenting to the new remote user said one of the true labels of (a); and (c) automatically applying said one of the true labels of (a) to the new graphic annotation, responsive to a selection made by the new remote user.

17. The system of claim 10, wherein the program code is further executable to automatically suggest one of the true labels during a new remotely-assisted augmented reality session held between a new remote user and a new local user, by:

(a) automatically analyzing, in real time, a new conversation between new the remote and local users, to detect a potential entity name that is being mentioned;

(b) automatically correlating the potential entity name of (a) with one of the true labels;

(c) automatically presenting to the new remote user:

said one of the true labels of (b), and a new graphic annotation at a location, in the 3D model, associated with said one of the true labels of (b); and (d) responsive to a selection made by the new remote user, automatically drawing the graphic annotation of (c), and presenting said one of the true labels of (b) in conjunction with the drawn graphic annotation of (c).

18. The system of claim 17, wherein the analysis of the new conversation between new the remote and local users comprises applying a reference resolution algorithm to a real time transcript of the new conversation.

19. A computer program product comprising a non-transitory computer-readable storage medium having program code embodied therewith, the program code executable by at least one hardware processor to:

receive data recorded during a remotely-assisted augmented reality session held between a remote user and a local user, the data comprising:

graphic annotations drawn by at least one of the remote and local users, wherein each of the graphic annotations is associated with a location in a three-dimensional (3D) model representing a physical scene adjacent the local user, and a transcript of a conversation between the remote and local users;

automatically generate at least one candidate label for each of the locations, wherein each of the candidate labels is textually descriptive of a physical entity that is located, in the physical scene, at a location corresponding to the respective location in the 3D model, and wherein the generation of each of the candidate labels comprises:

for each of the graphic annotations, automatically analyzing the transcript to detect at least one potential entity name that was mentioned, by at least one of the remote and local users, temporally adjacent the drawing of the respective graphic annotation; and accept or reject each of the candidate labels, to define the respective candidate label as a true label of the respective physical entity.

20. The computer program product of claim 19, wherein the program code is further executable to automatically suggest one of the true labels during a new remotely-assisted augmented reality session held between a new remote user and a new local user, by:

(a) automatically detecting that one of the new remote and local users has drawn a new graphic annotation at a location in the 3D model which is at or adjacent a location of one of the true labels;

(b) automatically presenting to the new remote user said one of the true labels of (a); and (c) automatically applying said one of the true labels of (a) to the new graphic annotation, responsive to a selection made by the new remote user.

* * * * *